March 4, 1969  G. K. HUNDLEY  3,431,449
NON-GLARE SEALED BEAM HEADLIGHTS
Filed Aug. 5, 1966  Sheet 1 of 2
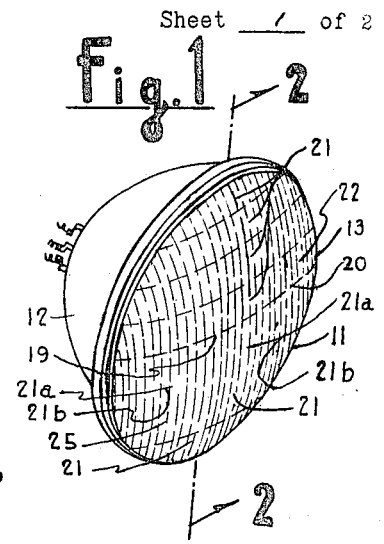
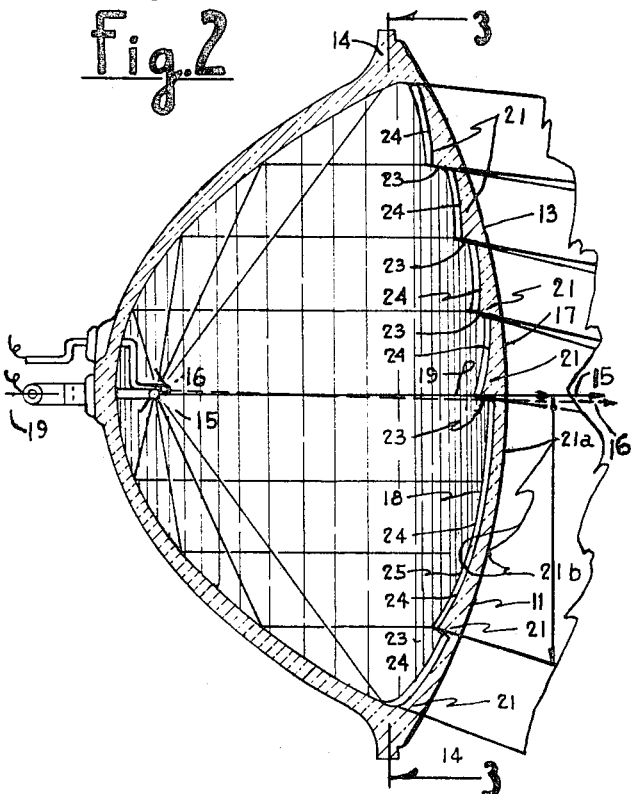
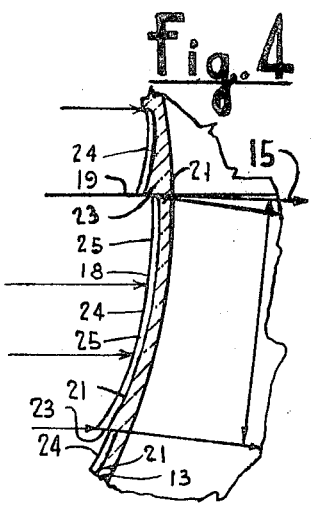
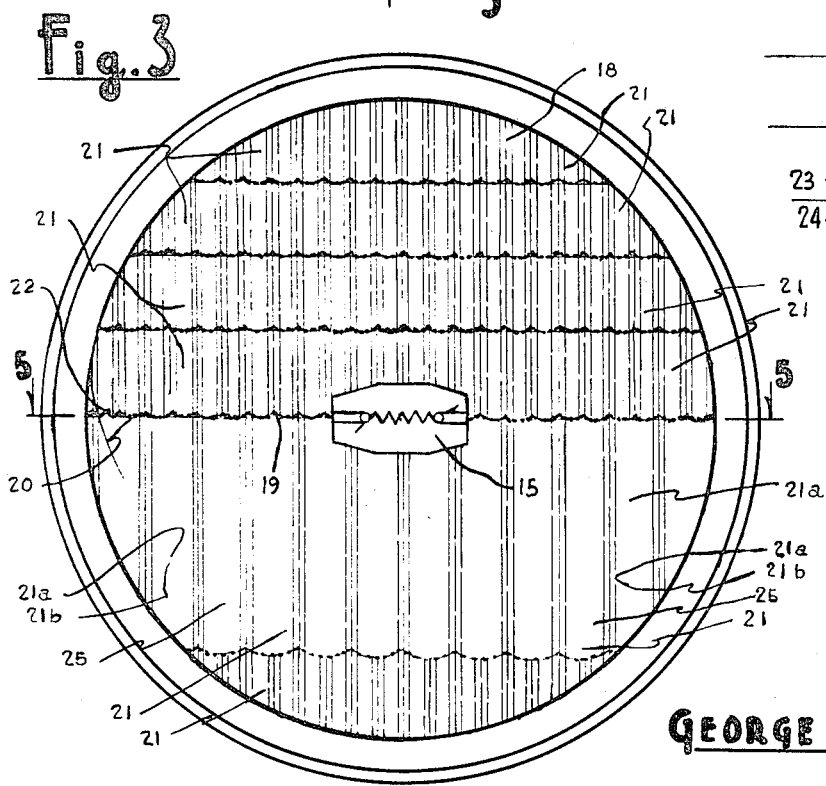
INVENTOR.
GEORGE K. HUNDLEY.

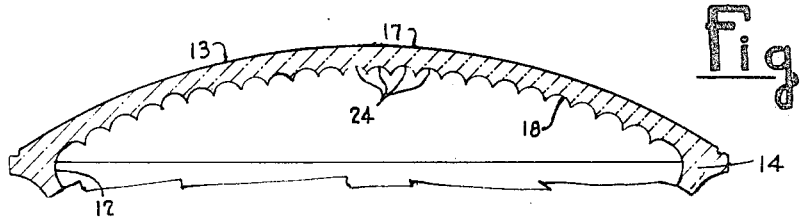
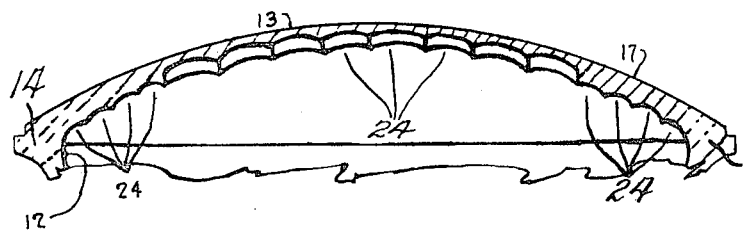
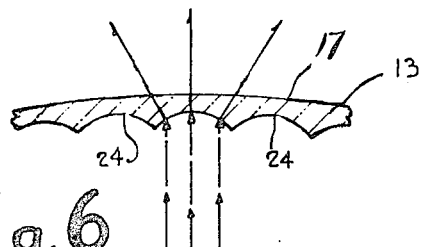
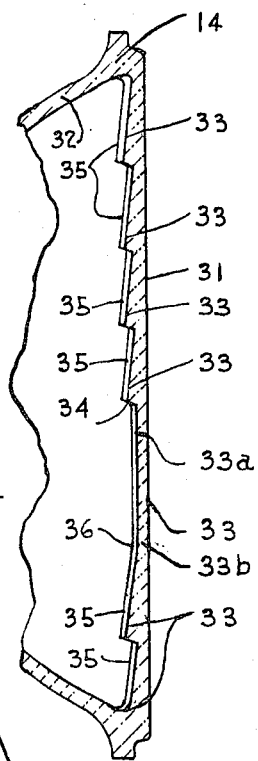
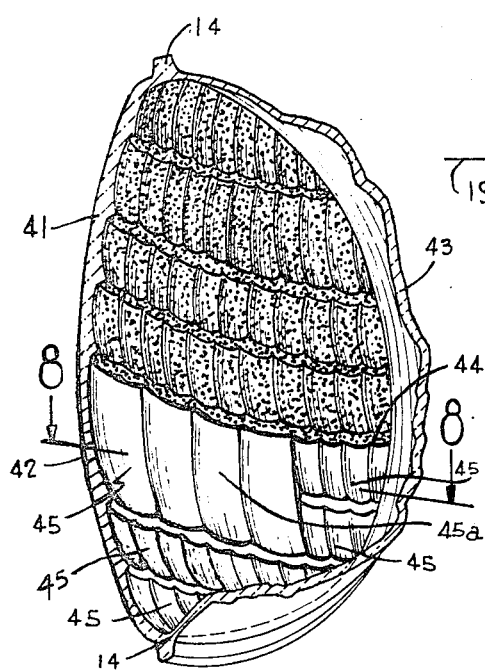

United States Patent Office 3,431,449
Patented Mar. 4, 1969

3,431,449
NON-GLARE SEALED BEAM HEADLIGHTS
George K. Hundley, Indianapolis, Ind., assignor to
Arthur R. Brown, Indianapolis, Ind.
Filed Aug. 5, 1966, Ser. No. 576,808
U.S. Cl. 313—111
Int. Cl. H01j *5/16, 61/40;* F21v *7/14*
6 Claims

ABSTRACT OF THE DISCLOSURE

A sealed beam lamp having a lens with a plurality of horizontally disposed prisms above the centerline, a portion below the centerline having parallel interior and exterior surfaces for a distance down from the centerline and then blending into a horizontally disposed prism.

Background of the invention

This invention relates in general to lamps and more particularly to lamps which are adapted to be used as vehicle headlamps.

These improved non-glare sealed beam headlights are an improvement over George K. Hundley Non-Glare Sealed Beam Headlights filed May 17, 1966, Ser. No. 550,717.

The primary object of the present invention is to provide an improved lamp which will incorporate means for controlling the direction of emitted light rays to obtain superior illuminating results.

A more specific object of this invention is the provision of an improved headlight which will give greater illumination on the upper and lower beams over longer distances than has been possible with previous lamps.

Another object of this invention is to provide a lamp of better illuminating qualities which will not glare if properly installed on a vehicle, and therefore, will not become a hazard to proper vision of approaching motorists.

A further object of this invention is to provide an improved lamp and lens therefor which will direct refracted light rays in a desired direction to obtain light concentration in designated areas in front of the vehicle.

Another object is the provision of a headlight system in which the lens and filaments are used for the purpose of depressing the rays of light passing therethrough to illuminate that portion of the highway immediately in front of the vehicle and to prevent the possibility of projected glare rays that occur in other headlamp constructions.

A still further object of this invention is the provision of a wide vertical portion of the lens adjacently below the centerline of junction 19, the lower side of the vertical portion being formed into a horizontal prism 21, the inner surface of the prism having a unique blended curve. The upper portion of the prism 21 forms the center point of juncture between the lower side of the vertical portion and the upper side of the horizontal prism as cited at 21b.

Yet a further object of this invention is the provision of a headlight lens in which a wider portion of the vertical combination structure of the lens below the centerline of juncture 19 is of constant depth from the convex exterior surface of the lens to the concave interior surface of the lens, which is blended as cited at 21b into the below adjacently disposed horizontal prism which forms a unique blended curve at the lower side of the vertical structure of the lens cited at 21a.

Inasmuch as we are confronted with the two and four lamp lighting system on automobiles, it was necessary to have lamp models that could be used in the two or four lamp lighting system; so in order to meet the automobile headlighting demands, you will notice FIGURE 2 is showing a parabolic reflector possessing two filaments, one filament being mounted in the focal point of the reflector and another filament being mounted in front and slightly above the filament in the focal point of the reflector. In order to have a practical lamp to be used on a two lamp vehicle, it was necessary to take a broad departure from the lighting system formerly used on two lamp cars. We are all aware of the fact up until now the upper filaments had been mounted directly above the center filament. Applicant found out that this principle was wrong. Tilting or dimming the lamps in the two light system has always proven to be dangerous. By dimming the lights you did not have a sufficient amount of light ahead of the vehicle, and by using a filament above a filament was equally as hazardous, as your light beams were reflected too sharply downward upon the highway a short distance ahead of the vehicle. This system is very dangerous considering the speed of the average automobile so what applicant has done is to place the upper filament in front and above the center filament, the lower edge of the filament being adjacently above the centerline of juncture. By so doing, when you switch from the horizontal beams you reflect a slightly declinational beam a short distance below the horizontal beam by the use of the upper filament. This will reflect the light several hundred feet in front of your car. At the same time this filament can be used while going over the crest of a hill, while driving on city streets and when the rear end of the vehicle is heavily loaded. These lights will take care of the motorist driving the car, as it is against the law unless you dim your lights or tilt your beams and this happens about 80% of the driver's time. Yet you are jeopardizing your life by tilting and dimming the lights. Applicant's improved lamps will take care of this problem on the two lamp cars, and there will be no problem on the four lamp cars, as all four of the light beams have been adequately taken care of by the improved configurations on the inner surface of the lens and by the proper mounting of one filament in the focal center of each of the reflectors, which will allow two lamps for the horizontal beams and two lamps for the declinational beams. In this way two of the lamps are producing the horizontal high beams and two of the lamps are producing the declinational low beams alternately by the regular use of the light switch.

Further aims, objects and advantages of this invention will appear from a consideration of the following description and the accompanying drawings showing for purely illustrative purposes the embodiments of this invention. It is to be understood, however, that the description is not to be taken in a limiting sense, the scope of the invention being defined in the appended claims.

In the drawings:

FIGURE 1 is an overall perspective front view of a preferred embodiment of the automobile head light incorporating principles of the present invention.

FIGURE 2 is a vertical section view taken along lines 2—2 of FIGURE 1;

FIGURE 3 is a vertical modified front view of a lens taken along vertical lines 3—3 of FIGURE 2 showing the full exterior surface of the lens incorporating principles of the present invention. The wider portion of the vertical combination structure of the lens below the centerline of juncture 19 is of constant depth from the convex exterior surface of the lens to the concave interior surface of the lens which is blended as cited at 21b into the below adjacently disposed horizontal prism which forms a unique blended curve 25 at the lower side of the vertical portion 21a as cited in FIGURE 2, the wide vertical portion being composed of the wide vertical flutes or channels as cited in FIGURE 6. The object of this arrangement is to control the upper and outer declinational beams, bringing them closer in upon the highway. At the same time the larger combination section composed of the wider vertical channels will give the beams a uniform spread of light horizontally, as well as laterally and downwardly at each side of the country road. It is to be noticed that the central portion of the lens has an area broken away in order to show a single filament back of the lens which is mounted in the focal point of the reflector, this being one of the four reflectors used in the quadruple system. Two of these reflectors reflect the light beams that pass through the large combination vertical section adjacently below the centerline of juncture, which reflects the horizontal beams; while the other two reflectors reflect the beams that pass through the enlarged prismatic section below the centerline of juncture as cited in FIGURE 4 of the drawings. This prismatic portion of the lens will reflect the declinational light beams that fall slightly below the horizontal line of the reflector several hundred feet down the country road. Applicant feels that this lighting feature will enable the motorist to switch from the horizontal beams to the declinational beams alternately. By this operation there will be no glare on the horizontal beams, although it is possible to drive with the declinational beams most of the time, and especially while going over the crest of a hill, while driving within the city limits and when the rear end of the vehicle is overloaded. It will be practical to switch from the high beams to the low beams, always burning two lights on the four lamp system alternately, but never having to burn four lights at the same time;

FIGURE 4 is an enlarged fragmentary vertical portion of the lens disclosing an enlarged horizontal prism formed in the lens adjacently below the centerline of juncture. The inner surface of this enlarged prism has a unique blended curve tapering gradually from the apex downwardly forming the thicker portion at the lower side of the prism, this prism section being much larger than any of the other prisms shown;

FIGURE 5 is a horizontal section view taken along lines 5—5 of FIGURE 3 showing a portion of the lens, especially of the fluted horizontal prisms just above the centerline of juncture;

FIGURE 6 is a fragmentary horizontal section view similar to that shown in FIGURES 3 and 7 and illustrating the principles of light refraction within these vertical flutes.

FIGURE 7 is a partial perspective view of the lamp of the present invention partially broken away to expose the interior surfaces of a modified embodiment;

FIGURE 8 is a horizontal section view taken along lines 8—8 of FIGURE 7; and

FIGURE 9 is a vertical section view similar to that shown in FIGURE 2; however, showing a third embodiment of the lens in which the smooth exterior surface is planar.

Referring to the drawings wherein like reference characters designate corresponding parts throughout the several figures, a sealed beam headlight embodying the principles of the present invention is shown generally by numeral 11. The headlight 11 is adapted for conventional mounting in a suitable housing in automobiles. Generally the sealed beam headlight comprises a preformed parabolic reflector 12 and a lens 13 which are fused together in the area generally designated by numeral 14 so as to form a hermetically sealed unit. Extending outwardly from the rear of the conventional reflector 12 are a plurality of filament contacts for supplying the needed power to operate the headlights. The conventional single horizontal filament 15 is positioned in the focal point of each reflector where the quadruple lighting system is used for reflecting the horizontal and declinational light beams. Another embodiment shows a reflector having a horizontal filament 15 in the focal point of the reflector and one horizontal filament 16 mounted slightly above and in front of the filament 15, the lower side of this filament being mounted adjacently above the centerline of juncture. In the four lamp structure of the lens the horizontal beams are accomplished by reflecting the light through the combination vertical planar section of the lens as cited in FIGURES 2 and 3; while the declinational beams are accomplished by reflecting the light beams through the enlarged prism section as cited in FIGURE 4. In the two lamp system the filament mounted in the focal center of the reflector and the filament mounted slightly above and in front of the center filament work alternately in conjunction with the combination vertical planar section as cited in FIGURES 2 and 3. The horizontal beams are those beams that are reflected through the vertical portion of the combination section by the center filament. The beams reflected by the upper filament will also reflect the light beams through the same combination vertical section, the upper filament reflecting the light slightly below the horizontal centerline of the reflector. The light will be reflected from the horizontal beam to the lower declinational beam alternately by the aid of the conventional light switch on the floor of the vehicle. The light beams will be reflected upwardly and downwardly in the same usual manner as heretofore with one exception—applicant's improved filament arrangement having the lower side of the upper filament mounted adjacently above the centerline of juncture, will reflect the light beams slightly below the horizontal beams for hundreds of feet ahead of the vehicle, which never could have been accomplished by using one filament above the other.

The lens of the embodiment shown by FIGURES 1, 5 and 6 has a smooth convex exterior surface 17 and a concave interior surface 18. The interior surface 18 is cut or molded to form two substantially equal sections 20 and 22 as cited in FIGURES 1 and 3 which meet in the zone of the horizontal centerline of the lens which may be more aptly described as the centerline of juncture and indicated by numeral 19. Although the juncture 19 is shown at the lens centerline, and, in most instances it will be at this line, the zone of the horizontal centerline may be slightly above or below the absolute centerline of the lens. In addition to the lens of headlight 11 being divided into two large main lens sections 20 and 22 defined by the centerline of juncture 19, each of these larger sections are further divided into a plurality of horizontally disposed prism sections 21. Each of the prisms 21 will have their bases 23 facing downwardly with respect to the headlight 11. Thus, it will be easily seen that the light rays passing through the prism sections 21 will be bent downwardly by the known physical laws of refraction, thus maintaining all of the individual beams of light projecting toward the roadway. Since the thickness of each prism section 21 varies from its top to the base 23, light rays impinging upon any vertical segment of a prism will necessarily be refracted more at the prism base than at the prism apex. Obviously then, light rays impinging upon the prisms near the base thereof will be refracted downwardly at greater angles than the light rays impinging upon the uppermost portion of the prism. This, then, gives a constant illumination of the roadway in front of the vehicle and spreads the beam of light in a desired manner to eliminate dark areas.

In order to spread the light laterally and to control its lateral direction, each individual prism section 21 is provided with a plurality of vertical channels or flutes 24 which are designed to extend the full height of each individual prism. These flutes are of particular constant cross-sectional shape to difuse the light laterally in a manner to project the light evenly across the roadway. It is desired in the present invention that no more light be refracted to one side of each flute than would be expected at a corresponding location at the other side of the flute. Such refraction is shown more clearly in FIGURE 6.

A particularly important part of the present invention involves the vertical combination portion of the lens in which the disposed portion 21a is located immediately below the centerline of juncture 19, as is easily noted from FIGURES 1, 2 and 3. This wider upper portion of the one piece combination section is much larger than all the other prismatic sections and is different in configuration than all the other prismatic sections as will be especially noticed in FIGURE 3. The wider portion of the combination section 21a is devoid of a horizontal prism, but is, in effect, the wider portion of the combination section of the headlight lens in which any vertical portion of the horizontal section between the centerline fo juncture 19 and the next below adjacently disposed blended prism 21 is of constant depth from the convex exterior surface 17 of the lens to the concave interior surface 18, as the vertical portion 21a comprises the constant depth portion of the lens, and also includes the vertically disposed flutes 24 extending the entire height of the one piece combination blended section.

Since the wider combination vertical portion 21a is of constant depth from the front to the rear, it is to be noticed that the lower side of this portion 21a is formed into a horizontal prism 21 at the juncture point 21b which is a part of the large one piece combination section. The lower side of the vertical portion 21a and the upper side of the prism 21 merge. At this point a unique blended curve 25 is formed below the lower side of the vertical portion of the lens which can be especially seen in FIGURES 2 and 3. Such a blended curve has been devised to overcome the problem that is encountered in the prior art sealed beam headlights wherein there is normally a dark area in front of the automobile upon the roadway. These dark areas occur becuse of poor light concentration brought about by the abrupt change of prism sizes between one horizontal prism section and another. In the present invention the light rays passing through the blended curve 25 are suitably disposed so as to eliminate the dark spots in front of the automobile, thereby giving a constant powerful illumination.

In the alternate embodiment illustrated by FIGURE 9 a planar lens is shown and indicated by numeral 31. While such a flat lens is not utilized normally in automobiles, such may be utilized for other types of illumination such as playgrounds, ball parks, airplane landing fields, etc. In this particular embodiment lens 31 is fused to the standard parabolic reflector 32 to form a unitary sealed beam lamp. Much in the same manner as was described for the preferred embodiment, the embodiment of FIGURE 9 comprises a plurality of prism sections 33 divided into two section halves by the centerline of juncture 34. Traversing the entire vertical width of each prism section are flutes 35 of the same configuration as previously described in the preferred embodiment. The adjacently disposed horizontal combination vertical portion below the centerline of juncture 34, is additionally identified by numeral 33a. It is desired that the juncture of these sections be made in the same manner as previously described to effect a blended curve 33b below the region indicated by numeral 36, being the juncture point. It is desired that any combination vertical portion of section 33a be of constant depth between the exterior surface and the interior surface of the lens 31. In addition, the rearmost faces of each prism section of the lens are planar in a vertical direction with the only curvature being the lateral curvature of the flutes 35. Such is not the case of the preferred embodiment wherein the vertical portions of the rearmost faces of each prism section have a concave configuration generally toward the focal point of the lamp.

And yet, another embodiment illustrated by FIGURE 7, which embodiment corresponds generally to the preferred embodiment of FIGURE 8, there is shown a lamp 41 having a lens 42 which is fused together with a parabolic reflector 43. The lamp 41 differs from the previously described embodiments in that the interior surfaces of the lens 42 above the centerline of juncture 44 are uniformly pitted by a suitable sand blasting technique or other means to provide a frosted surface to easily diffuse stray light rays passing through the lens. Such a pitting technique diffuses the emitted light rays passing through the upper half of the prismatic section above the centerline of juncture 44. This pitting technique may be incorporated in the auto headlight if desired, but the primary purpose of the pitting technique is to be especially used in the lens where a much greater candlepower is used for the purpose herein previously described, and would not necessarily have to be used in th standard automobile headlight. This working principle would have to be decided upon by the manufacturer building these lamps.

It is to be especially noticed in FIGURE 7 the combination vertical portion 45a just below the centerline of juncture 44 is similar to section 21a described in FIGURE 3, except that at each end of the vertical portion there is a section devoted to full size prisms 45. The central wider portion 45a does not have fully defined prisms, but is, in effect, a portion of the lens of the headlight in which any vertical portion between the centerline of juncture and the next below adjacently disposed prism section is of constant depth from the convex exterior surface of the lens to the concave interior surface.

In the present invention the wider vertical portion below the centerline of juncture was described in FIGURE 3 as being of constant depth from front to rear of the lens. Additionally, it was shown in FIGURE 7 that the combination vertical portion below the centerline of juncture might have flanking ends of full prisms 45 and that the central portion of this section might be of greater or lesser width or length depending on the use to which the lamp might be put. While the broken away portion of the lamp in FIGURE 7 shows only part of the entire lens, it is readily apparent the remaining not shown portion is similar to that shown.

FIGURE 10 is showing a vertical segment disclosing one horizontal filament 16 mounted slightly above the focal point at the base of the reflector, the lower side of the horizontal filament 16 resting adjacently above the centerline of juncture just far enough to remove the horizontal filament 16 slightly above the focal center of the reflector. This single horizontal filament is located at the base of the reflector as cited in FIGURE 2. Instead of using the lower filament 15 as cited in FIGURE 2, the horizontal filament 16 is removed into an offset position at a short distance above the focal point of the reflector in two of the quadruple lamps, this being one of the two reflectors that reflect the slightly declinational beams below the horizontal beams in the quadruple lighting system. A single filament 15 as cited in FIGURE 3 is mounted in the focal center of the other two reflectors that make up the quadruple lighting system. With this filament arrangement the declinational beams will be reflected through the large prismatic section of the lens as cited in FIGURE 4, while the single filaments that reflect the horizontal beams will be reflected through the large combination vertical planar portion of the lens as cited in FIGURES 1, 2, 3, 7 and 9. With this lighting principle, there will be no glare rays of light reflected from the horizontal beams, and since the horizontal beams and the declinational beams are reflected upwardly and downwardly by the use of the light switch on the floor of the vehicle alternately, the declinational beams can be used at least 80% of the motorist's time along the highway, especially when the rear of the vehicle is heavily loaded, and while going over the crest of a hill and while driving in the city limits. This same lighting principle is virtually used in FIGURE 2 by the aid of two filaments in one reflector. The same results are achieved by using one filament in the focal center of two reflectors, and one filament above the focal center of two reflectors; these four reflectors being used to make up the quadruple lighting system.

All of the horizontal prisms of the lens above the centerline of juncture can be of any uniform thickness at their apex and at their bases. All of the horizontal prisms of the lens below the centerline of juncture can be of any uniform thickness at their apex and at their bases.

Various modifications may be made in the invention without departing from the spirit and scope thereof, and it is desired, therefore, that only such limitations shall be placed thereon as are imposed by the prior art and are set forth in the appended claims.

What is claimed is:

1. An improved lamp comprising a sealed beam unit including a reflector, a filament and a lens, the lens having a smooth exterior surface and an interior surface contoured to provide two vertically superposed main sections joined in the zone of the horizontal centerline of the lens, the uppermost vertically superposed main section having a plurality of horizontally disposed prism sections extending from side to side of the lens, each prism section in the uppermost main lens section comprising a prism having a plurality of vertical flutes of horizontally curved cross-section formed in the interior surface of the lens and traversing the entire uppermost main lens section, the lowermost main lens section having a plurality of horizontally disposed prism sections extending from side to side of the lens and having a plurality of vertical flutes of horizontally curved cross-section formed in the interior surface of the lens and traversing the entire lowermost main lens section, one of said lower-most prism sections being adjacently below the center line of juncture with the upper-most lens section and vertically longer than any of the other sections, the upper portion of the one section having parallel interior and exterior surfaces in all vertical planes for reflecting horizontal light beams, the lower portion of the one section having its inner surface curved inwardly to form a horizontal prism and blending with the upper portion of the section for transmitting light beams below the horizontal light beams that are reflected through the upper portion of the one section.

2. An improved lamp as claimed in claim 1 wherein the vertical flutes adjacently below the horizontal centerline of juncture are a greater width than the rest of the vertical flutes.

3. An improved lamp having a lens with a horizontal centerline of juncture and a vertical combination portion immediately below said centerline, said combination portion having a large vertical planar section immediately below said centerline and including parallel interior and exterior surfaces in all vertical planes for reflecting horizontal light beams, said combination portion having a lower side formed into a horizontal prism, a unique blended curve on the inner surface of said combination portion merging a lower side of said vertical planar section with the upperside of the horizontal prism for reflecting blended declinational light beams, the large vertical planar section being provided with wide vertical channels for spreading a wider range of light, each end of the large vertical section being flanked by full narrow flanking prisms for reflecting more light downwardly upon the shoulders at each side of the country road.

4. An improved lamp having a lens with upper and lower vertically superposed main sections joined in the zone of the horizontal centerline of the lens, the section above said centerline having a plurality of horizontally disposed prisms therein, said prisms having a base-down configuration, the lens having a convex exterior surface and a concave overall interior surface configuration, and having a lower section below said centerline and adjacent to the zone of the horizontal centerline of the lens, a larger portion of said lower section having parallel interior and exterior surfaces in vertical planes, a lower portion of said lower section being formed into a horizontal prism that forms a unique blended curve for reflecting declinational light beams below horizontal light beams.

5. An improved lamp as set forth in claim 4 wherein said prisms above the centerline and said prism below the centerline extend from one side of the lens to the other side of the lens, the prisms being the same thickness at their apex and being the same thickness at their bases for reflecting uniform light beams sharply downwardly, the prisms of the upper section of the lens and a prism of the lowermost portion of the lower section of the lens having narrow vertical channels, while said larger portion has wider vertical channels, for spreading the light beams in designated areas.

6. An improved lamp comprising a reflector, a lens, and a filament in the focal point of said reflector, the lens having a smooth exterior surface and an interior surface contoured to provide upper and lower vertically superposed main sections joined in the zone of the horizontal centerline of the lens, the upper section having a plurality of horizontally disposed prism sections extending from side to side of the lens, each said prism section having a plurality of narrow vertical uniform flutes of horizontally curved cross section formed in the interior surface of the lens and traversing the entire upper section, a portion of the lower main lens section having a horizontally disposed prism section extending from side to side of the lens, and having a plurality of narrow vertical uniform flutes of horizontally curved cross section formed in the interior surface of the lens and traversing a portion of the lower section, said lower section having an enlarged vertical combination portion beginning adjacently below the centerline of juncture of said main sections, the upper area of this combination portion having parallel interior and exterior surfaces in vertical planes for reflecting horizontal light beams, the lower area of said combination portion being formed into a horizontal prism having a unique blended curve for reflecting declinational blended light beams below the horizontal light beams.

References Cited

UNITED STATES PATENTS 2,880,347  3/1959  Flaws et al. _____ 313—115

FOREIGN PATENTS 570,753  12/1957  Italy.

OTHER REFERENCES

Publication entitled "Tilt Ray Headlamps," of the Guide Motor Lamp Mfg. Co., Cleveland, Ohio.

JAMES W. LAWRENCE, *Primary Examiner.*

PALMER C. DEMEO, *Assistant Examiner.*

U.S. Cl. X.R.

313—113, 115, 116; 240—41.25, 41.3